United States Patent [19]
Roberts

[11] 3,828,461
[45] Aug. 13, 1974

[54] CRAB TRAP

[76] Inventor: Grant W. Roberts, 19 E. Center St., Folly Beach, S.C. 29439

[22] Filed: Dec. 8, 1972

[21] Appl. No.: 313,541

[52] U.S. Cl. ............................................... 43/102
[51] Int. Cl. ............................................ A01k 69/08
[58] Field of Search ............... 43/100, 102, 105, 61

[56]  References Cited
UNITED STATES PATENTS
2,374,522   4/1945   Andrews ................................ 43/61
2,603,030   7/1952   Pape ................................. 43/102 X Primary Examiner—Louis G. Mancene
Assistant Examiner—Daniel J. Leach
Attorney, Agent, or Firm—Cushman, Darby & Cushman

[57]  ABSTRACT

A porous crustacean trap having at least one pair of opposed hinged doors which may be placed in either an open or closed position by a linkage mechanism which is mounted atop the trap and connects the hinged doors to a lifting line. When tension is placed on the lifting line, the linkage mechanism operates to close the hinged doors, but when the line is not in tension, flexible straps or the like provide the necessary force to overcome the weight of the hinged doors and open the hinged doors to permit crabs and other marine animals to enter. The linkage mechanism is pivotally hinged to enable the operator to selectively open either end to remove crabs or other crustaceans from one end while preventing their exit from the other.

6 Claims, 3 Drawing Figures

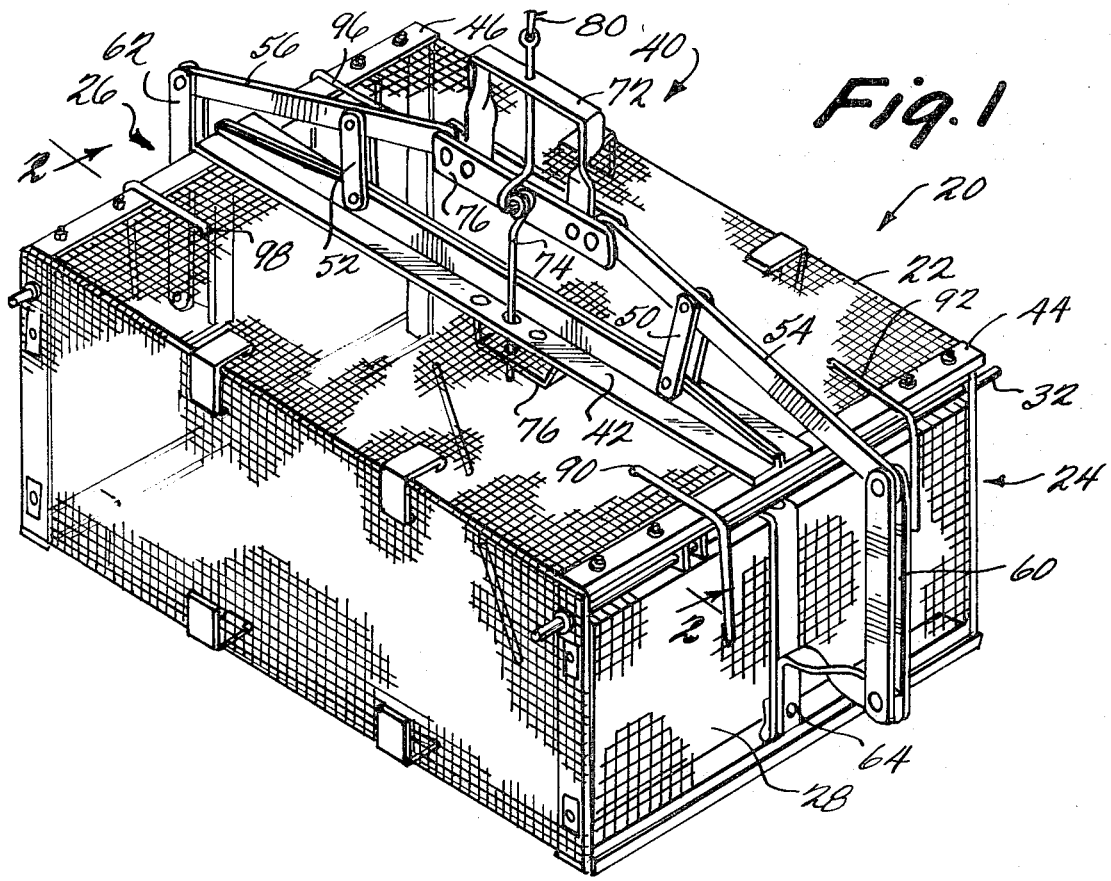
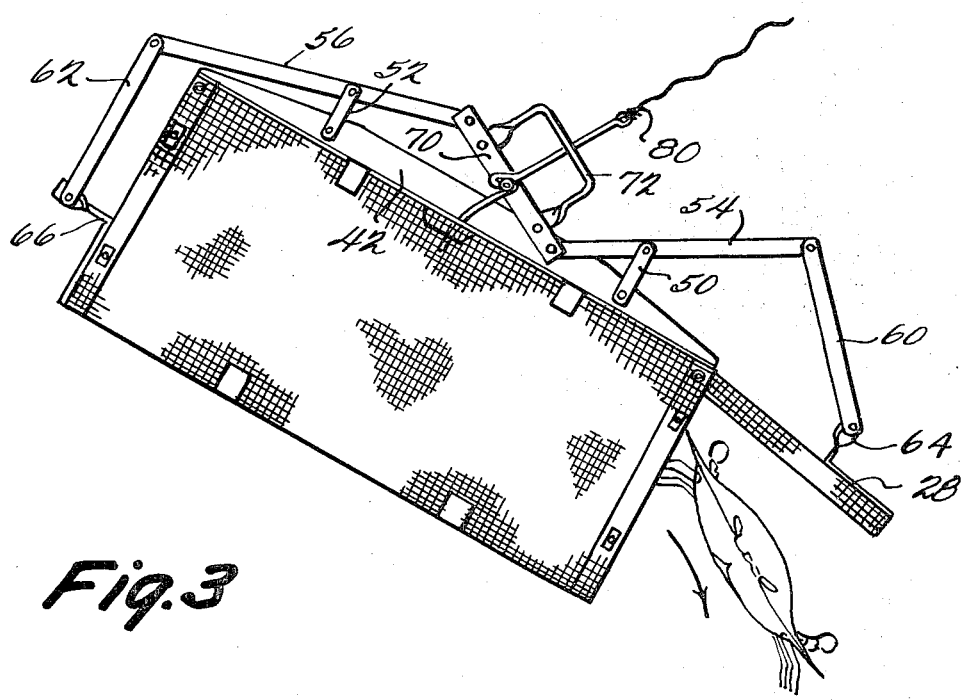

CRAB TRAP

BRIEF DESCRIPTION OF THE PRIOR ART AND SUMMARY OF THE INVENTION

The invention relates to a trap for crabs and other marine animals.

Many different kinds of traps have been used over the years for catching crabs and other marine animals. One type of trap which has been found to be particularly effective is made of wire mesh with one or more pivotably mounted doors which are connected by a linkage or other mechanism to a line by which the trap is lowered to the bottom of a body of water. The mechanism is constructed so that, while the trap is resting on the bottom, the doors remain open to permit crabs and other animals entrance into the trap, usually drawn by bait attached in some fashion to the inside bottom of the trap. Frequently, the doors, together with the rest of the trap enclosure, are formed of mesh wire. After some time has passed, the crab trap is pulled up by means of the attached line and the force exerted in pulling up the trap operates to close the doors to prevent escape of the crabs and other animals during retrieval of the trap. The patents to Ruiz, U.S. Pat. No. 2,821,047, and Portner, U.S. Pat. No. 2,918,749, are typical of this kind of construction.

A number of problems have arisen in conjunction with the use of these kinds of traps. One of the difficulties with traps which have been used in the past as discussed above is the difficulty in removing crabs and other marine animals from the trap after they have been raised to the surface. In particular, in traps which have at least two opposed doors, which are desirable for permitting the crabs easy ingress into the trap, the crabs tend to escape out the other door while the trap is being shaken over a container situated below one of the opened doors. Further, the doors are normally pivoted so as to lie down on the bottom of the body of water while open, so that the crabs must crawl over the doors into the trap. It is generally more desirable to permit the crabs direct entry into the trap.

The present invention relates to an improved construction for a crab trap with two opposed doors which are opened and closed by a linkage mechanism mounted atop a wire mesh cage or enclosure and connected to a line for lifting the trap and crabs from the water. The linkage mechanism includes a number of linkage members which are pivotably connected together so that the two opposed doors or sides are closed as the trap is lifted and opened while the trap is resting on the bottom. For assisting in opening the two doors flexible straps or the like are preferably connected between the top of the cage and the door for urging the two doors toward the open position.

Further, the linkage mechanism can be easily and simply operated once the trap and the crabs have been raised to the surface to open either one of the sides or doors, while the other side or door remains closed. Thus, the crabs can be easily shaken out one open door without any escaping out the other door which remains closed.

Further, the two opposed doors are preferably pivoted about the top of the cage so that they do not lie on the bottom of the body of water while the cage is in the open position for enticing crabs into the trap. Bait, such as rotten meat or the like, is preferably held within the cage by means of further flexible straps which are connected between two parts of the wire mesh of the cage bottom.

Many other objects and purposes of the invention will become clear from the following detailed description of the drawings.

BRIEF DESCRIPTION OF THE DRAWINGS

FIG. 1 shows a perspective view of the crab trap of this invention with the two opposed sides or doors in the closed position.

FIG. 3 shows a side view of the trap of FIG. 1 in use opening one door for dumping crabs from the trap while maintaining the other door in the closed position.

DETAILED DESCRIPTION OF THE DRAWINGS

Figure 2:
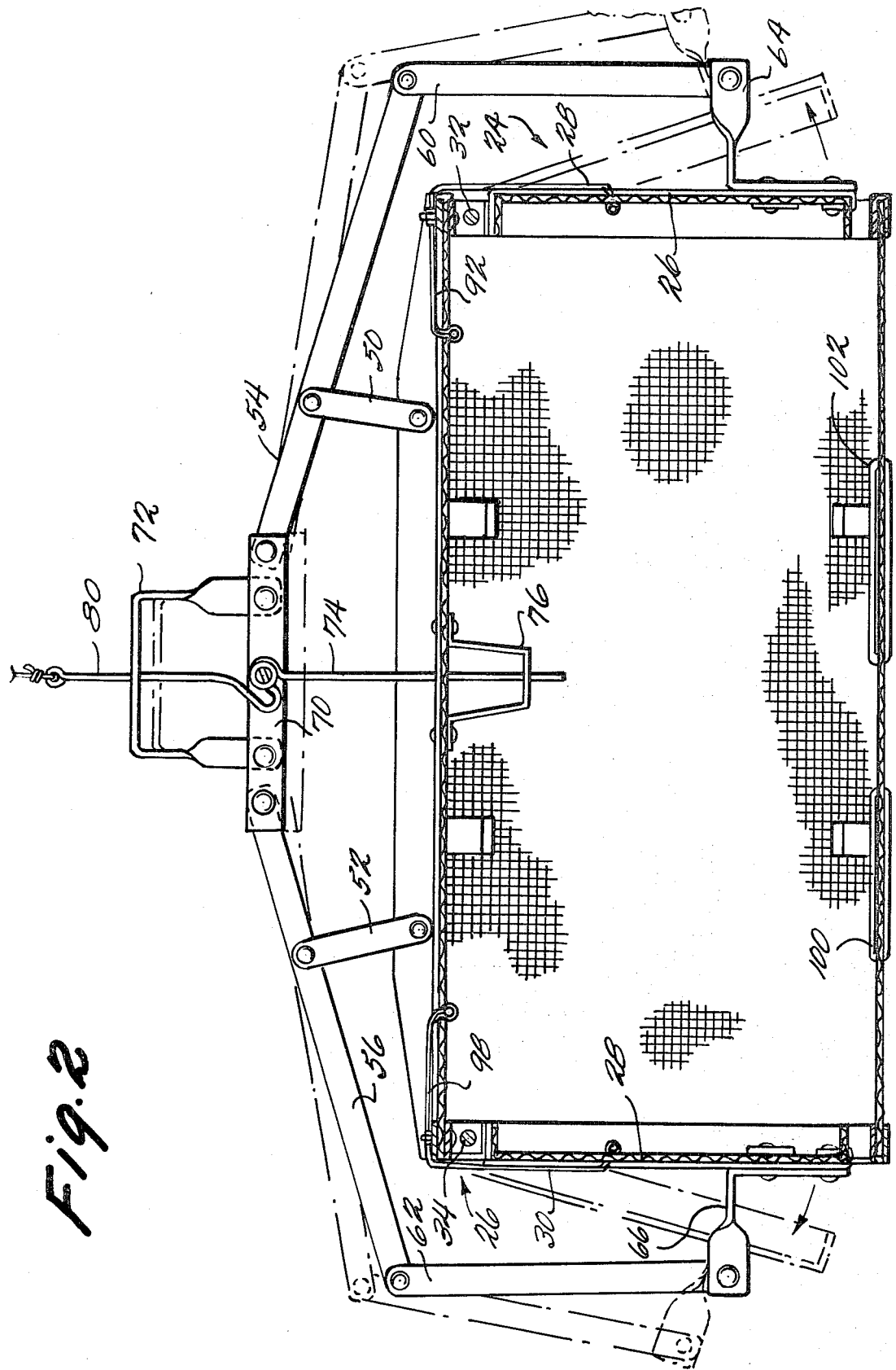
FIG. 2 shows a cut-away view of the trap of FIG. 1 along the lines 2—2.

Reference is now made to FIGS. 1 and 2 which show respectively a perspective view of the crab trap 20 of this invention and a cut-away view of the trap of FIG. 1 along the lines 2—2. As other similar traps, trap 20 is constructed of wire mesh of a suitable size for preventing escape of any marine animals to be trapped, and also permitting water to freely flow through the trap to minimize resistance in raising and lowering the trap from the bottom. Trap 20 consists of an enclosure 22 which has two opposed open sides or ends 24 and 26. A pair of closure members 28 and 30 are pivotably mounted about shafts 32 and 34, respectively, for movement between a position permitting entrance of crabs and other marine animals into the cage and a position essentially closing the sides 24 and 26 to prevent escape of marine animals from enclosure 22.

Closure members 28 and 30 are also preferably constructed of wire mesh. As can be seen in FIG. 2, closure members 28 and 30 need not close the openings 24 and 26 entirely, and a small gap may be provided at the bottom or otherwise so long as the gap is not large enough to permit escape of crabs and other similar animals.

A linkage mechanism generally indicated as 40 is mounted atop enclosure 22 and is connected to closure members 28 and 30 for shifting these members between closed and open position appropriately. Linkage 40 includes a base member 42 which is fixedly secured to the wire mesh at the top of the cage and preferably attached to supporting members 44 and 46 which run along the top of enclosure 22 at either end as can be best seen in FIG. 1. A pair of linkage members 50 and 52 are pivotably connected to fixed base member 42 as illustrated and are in turn pivotably connected to linkage members 54 and 56, respectively, at locations intermediate their ends. Linkage members 56 and 54 in turn are connected at one end to a further pair of linkage members 60 and 62 which are themselves pivotably connected to brackets 64 and 66 which fixedly connect to closure members 28 and 30, respectively. The linkage mechanism is completed by a center linkage member 70 which is pivotably connected between the ends of linkage members 54 and 56 as illustrated, and which includes a handle member 72 and a rigid guide rod 74 which passes through a hole in fixed member 42 and is journaled for vertical movement by a guide member 76 within enclosure 22. Guide rod 74 prevents the linkage mechanism from flopping from one side to the other. A lead line 80 which may be a cord or other material is attached to handle 72 for raising and lowering trap 20 and also effecting the desired opening and closing of the enclosure members 28 and 30.

Flexible straps 90 and 92 are connected between the wire mesh atop cage 22 and the wire mesh of closure member 28. Similar straps 96 and 98 are connected between the top of enclosure 22 and closure member 30. These straps, which may be simply bands of rubber or the like, operate as spring members to normally urge closure members 28 and 30 into an open position, rotating in the directions indicated by the arrows in FIG. 2 to a position permitting entrance of crabs and other crustaceans and the like into the trap. Further, flexible straps 100 and 102, as can be best seen in FIG. 2, are provided within the cage for holding bait such as rotten meat to attract the animals.

The cage is first lowered to the bottom with appropriate bait held in place by straps 100 and 102. When the trap is setting on the bottom, the downward force provided by the weight of the handle member 72 on the center linkage mechanism 70 as well as the force exerted by straps 90, 92, 96 and 98 causes closure members 28 and 30 to open, permitting crabs and other marine animals to enter the trap. After a time has elapsed which should be sufficient to attract crabs, an upward force is applied to line 80 to return the trap to the surface. This upward force operating through linkage member 70 causes closure members 28 and 30 to close sides 24 and 26, respectively, as can be seen in FIG. 2. These sides then remain closed as the trap 20 is being raised to the surface and thereafter so long as tension remains applied to line 80.

As indicated above, one of the primary advantages of the trap of this invention is the ability to open either of closure members 28 and 30 while maintaining the other closure member closed. Referring to FIG. 3, it can easily be seen that by a simple movement of handle 72 which can be effected with one hand, either closure member 28 or 30 can be opened while the other remains closed. The crabs or the like can then be shook from the open end into a basket or other container without the danger of escape from the other end and with great ease and simplicity.

While the embodiment of the invention described above is provided with only one pair of opposed doors, it is, of course, understood that all four sides of the enclosure can be made to open and appropriate closure members provided. However, it has been found to be preferred to provide only two opposed doors rather than four, and surprisingly, it has been found that more crabs are caught with only two doors which open rather than four. It is believed that some of the crabs become entangled in the wire mesh of the fixed sides of the cage and are unable to escape. It is further possible that some crabs, having found their way into the trap through one of the opposed open doors, are unable to escape and continue to try to leave by way of the fixed sides.

Many changes and modifications in the above described embodiment of the invention are, of course, possible without departing from the scope of that invention. Accordingly, that scope is intended to be limited only by the scope of the appended claims.

What is claimed is:

1. A marine animal trap comprising:
   a porous enclosure having a top, bottom and at least a pair of opposed open sides,
   a pair of closure members,
   means for pivotably attaching said closure members to said enclosure, each of said closure members being pivotable between a position substantially closing one of said open sides and an open position permitting entrance of marine animals into said enclosure,
   linkage means mounted on said enclosure, connected to said closure members and connected to a lifting line for applying a force to said closure members to cause said closure members to pivot to said closing position when a force is applied to said lifting line including a central linkage member connected to said lifting line, further linkage means pivotably connecting said central linkage members to one of said closure members for communicating a force applied to said central linkage member to said one closure member to cause pivotal movement of said one closure member, second further linkage means pivotably connecting said central linkage member to the other of said closure members for communicating a force applied to said central linkage member to said other closure member to cause pivotal movement of said other closure member, either one of said closure members being independently pivotable by manual application of force to said central linkage member to an open position while the other closure member remains in said closing position.

2. A trap as in claim 1 wherein said closure members are pivotably attached to the top of said enclosure.

3. A trap as in claim 1 wherein said enclosure and closure members are formed of wire mesh.

4. A trap as in claim 1 wherein said enclosure has four sides including two opposed side portions permanently closing said enclosure on two sides.

5. A trap as in claim 1 wherein said linkage means includes:
   a first pair of linkage members each having one end pivotably connected to one of said closure members,
   a second pair of linkage members each having one end pivotably connected to the other end of each of said first pair of linkage members,
   means pivotably connecting said central linkage member at the ends thereof to the other ends of said second pair of linkage members, and
   a third pair of linkage members each pivotably connected at one end to the top of said enclosure and at the other end to one of said linkage members of said second pair of linkage members intermediate its end.

6. A trap as in claim 1 including a pair of flexible straps each connected between the top of said enclosure and one of said enclosure members urging said enclosure members toward said open position.

* * * * *